United States Patent
Kaibara

(10) Patent No.: US 11,089,217 B2
(45) Date of Patent: Aug. 10, 2021

(54) IMAGE-PICKUP APPARATUS AND CONTROL METHOD THEREOF

(71) Applicant: CANON KABUSHIKI KAISHA, Tokyo (JP)

(72) Inventor: Hiroshi Kaibara, Hino (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 16/449,726

(22) Filed: Jun. 24, 2019

(65) Prior Publication Data

US 2020/0014860 A1    Jan. 9, 2020

(30) Foreign Application Priority Data

Jul. 6, 2018 (JP) ............................. JP2018-129311

(51) Int. Cl.
*H04N 5/232* (2006.01)
*H04N 5/235* (2006.01)

(52) U.S. Cl.
CPC ..... *H04N 5/232411* (2018.08); *H04N 5/2353* (2013.01); *H04N 5/23229* (2013.01); *H04N 5/23245* (2013.01)

(58) Field of Classification Search
CPC ......... H04N 5/232411; H04N 5/23245; H04N 5/2353; H04N 5/23229; H04N 5/3575; H04N 5/3765; H04N 5/3698
See application file for complete search history.

(56) References Cited

U.S. PATENT DOCUMENTS

| | | | | |
|---|---|---|---|---|
| 7,265,784 | B1* | 9/2007 | Frank | H04N 5/2351 348/222.1 |
| 2014/0253765 | A1 | 9/2014 | Takeshita et al. | |
| 2015/0271405 | A1* | 9/2015 | Lameer | H04N 5/2353 348/222.1 |
| 2015/0271407 | A1* | 9/2015 | Tanaka | H04N 5/2355 348/220.1 |

(Continued)

FOREIGN PATENT DOCUMENTS

| | | |
|---|---|---|
| JP | 2014175692 A | 9/2014 |
| JP | 2016225970 A | 12/2016 |

OTHER PUBLICATIONS

Dictionary.com definition of "calculator", retrieved from https://www.dictionary.com/browse/calculator on Feb. 18, 2021 (Year: 2021).*

*Primary Examiner* — Timothy J Henn

(74) *Attorney, Agent, or Firm* — Carter, DeLuca & Farrell LLP

(57) ABSTRACT

An image-pickup apparatus suppresses noise at a high speed while reducing power consumption by controlling the number of sampling operations in signal processing for suppressing noise of an imaging element. The image-pickup apparatus of the present invention includes an imaging element having a plurality of pixel units, a control unit performing first control of acquiring a first signal that is a noise signal from the pixel units and second control of acquiring a second signal based on signal charge generated by photoelectric conversion units of the pixel units, and a signal processing unit subtracting the first signal from the second signal, and the control unit performs control of changing the number of sampling operations of the second signal.

16 Claims, 9 Drawing Sheets

(56) References Cited

U.S. PATENT DOCUMENTS

| | | | |
|---|---|---|---|
| 2016/0037060 A1* | 2/2016 | Lim | G06T 5/009 |
| | | | 348/241 |
| 2016/0182798 A1* | 6/2016 | Thorn | H04N 5/23232 |
| | | | 348/208.1 |
| 2017/0104946 A1* | 4/2017 | Hong | H01L 27/14627 |
| 2017/0214847 A1* | 7/2017 | Wu | H04N 5/2353 |
| 2017/0234994 A1* | 8/2017 | Nishihara | G01T 1/2018 |
| | | | 250/361 R |
| 2018/0103214 A1 | 4/2018 | Ise et al. | |
| 2018/0227529 A1* | 8/2018 | Mo | H04N 5/3575 |
| 2019/0138259 A1* | 5/2019 | Bagaria | G06T 5/009 |
| 2019/0379827 A1* | 12/2019 | Berkovich | H04N 5/23254 |

* cited by examiner

IMAGE-PICKUP APPARATUS AND CONTROL METHOD THEREOF

BACKGROUND OF THE INVENTION

Field of the Invention

The present invention relates to signal processing for suppressing noise of a solid-state imaging element.

Description of the Related Art

Digital cameras have solid-state imaging elements such as a complementary metal oxide semiconductor (CMOS) image sensor and perform image processing for acquiring signals with low noise by using the solid-state imaging elements. In such signal processing, noise is removed generally by performing a correlated double sampling (CDS) process on output signals of pixel units.

Reading of signals from pixel units for one horizontal row, for example, will be described. First, input of amplifier circuits of the pixel units for one horizontal line is reset, output signals of the amplifier circuits at the time are stored for the one horizontal line as noise signals, and a reading operation (which will be referred to as "N-reading" below) of stored signals is performed. Next, the amplifier circuits read signals of the pixel units for the one horizontal line, the output signals of the amplifier circuits at the time are stored for the one horizontal line as pixel signals, and a reading operation (which will be referred to as "S-reading" below) of stored signals is performed. Then, the pixel signals and the noise signals are paired for each pixel unit and the paired signals are output from the imaging elements. After that, a process of subtracting the noise signals from the pixel signals, the so-called CDS process, is performed, and thereby a noise-suppressed image signal can be acquired.

An image-pickup apparatus disclosed in the publication of JP 2014-175692A extracts the variation of a plurality of sampling values obtained by performing signal sampling multiple times, compares the variation with a predetermined reference value, and switches signals to be output to processing units located in a subsequent stage according to the comparison result.

On the other hand, in an image-pickup apparatus disclosed in the publication of JP 2016-225970A, the imaging element has a circuit layer and a pixel layer (a first semiconductor substrate and a second semiconductor substrate). A frame memory and a line memory are provided in the circuit layer, and image data of the pixel layer is stored in the memories temporarily. A resizing conversion, partial clipping, or the like for converting the image data stored in the memories into data in an optimum image size according to a drive mode is performed in the circuit layer, and then the data is output.

When making great use of the process in which a plurality of sampling are performed in each CDS process in the related art, time constraints are likely to occur due to a reduction in the reading rate of image signals and power consumption is likely to increase.

SUMMARY OF THE INVENTION

An objective of the present invention is to suppress noise by a high-speed processing while reducing power consumption by controlling the number of samplings in signal processing for suppressing noise of an image element.

An image-pickup apparatus according to a preferred embodiment of the present invention includes an imaging element that has a plurality of pixel units, a control unit that performs first control for acquiring first signals which are noise signals from the pixel units and second control for acquiring second signals based on signal charges generated by photoelectric conversion units of the pixel units, and a signal processing unit that subtracts the first signal from the second signal, wherein the control unit performs control of changing the number of sampling operations of the second signals.

According to the present invention, noise can be suppressed by a high-speed processing while reducing power consumption by controlling the number of sampling operations in signal processing for suppressing noise of an imaging element.

Further features of the present invention will become apparent from the following description of exemplary embodiments with reference to the attached drawings.

DESCRIPTION OF THE EMBODIMENTS

A preferred embodiment of the present invention will be described below in detail with reference to appended drawings. Although an application example to a digital camera will be described in the embodiment, the present invention is not limited thereto. The present invention is applicable to various apparatuses having an imaging function, such as mobile telephone terminals, portable image display apparatuses, television apparatuses with cameras, digital photo frames, music players, game machines, and electronic book readers.

Figure 1:
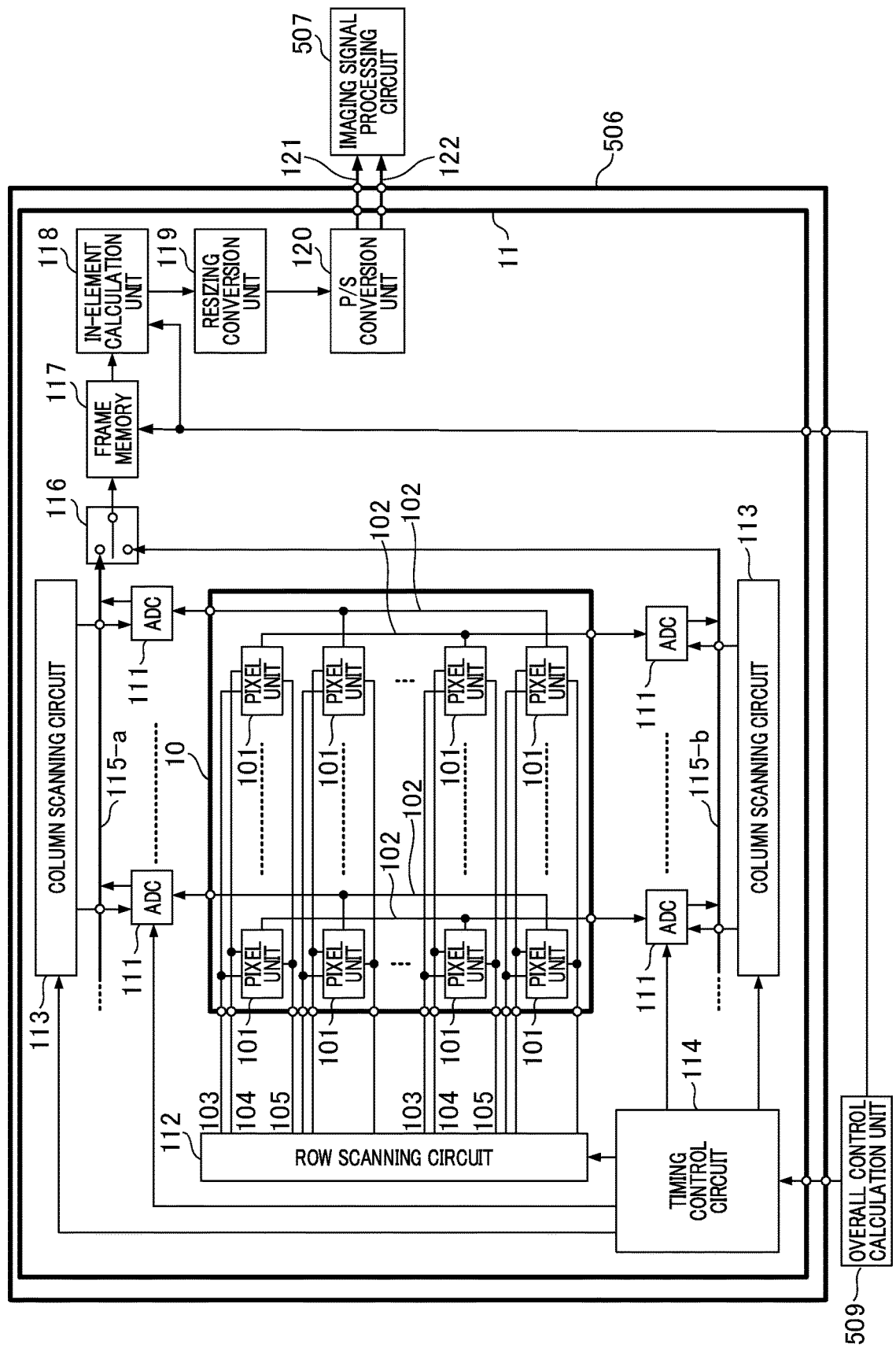
FIG. 1 is a diagram illustrating a schematic structure of an imaging element according to an embodiment of the present invention.

FIG. 1 is a diagram illustrating a schematic structure of an imaging element according to an embodiment of the present invention. The imaging element 506 has a configuration in which many pixel units 101 constituting an imaging unit are disposed in a two-dimensional array shape. The stacked-type imaging element 506 has a first chip 10 constituting the imaging unit and a second chip 11 constituting a signal processing unit. The imaging element 506 is connected to an imaging signal processing circuit 507 and an overall control calculation unit 509. The imaging signal processing circuit 507 processes output signals of the imaging element 506. The overall control calculation unit 509 is the core unit that controls the imaging element 506 and other constituent units included in the image-pickup apparatus (see FIG. 5). Although the imaging signal processing circuit 507 and the overall control calculation unit 509 are configured as separate circuits in the present embodiment, the present invention is not limited thereto, and may be integrally formed using a common central processing unit (the CPU).

In the first chip 10, a plurality of pixel units 101 are arrayed in a matrix shape. Each of the pixel units 101 is connected to corresponding signal lines 103, 104, and 105, that is, one of transfer signal lines 103, one of reset signal lines 104, and one of row selection signal lines 105 In this context, the transfer signal lines 103, the reset signal lines 104, and the row selection signal lines 105 are respectively provided in every row of the matrix one by one.

In addition, each of the pixel units 101 is connected to one corresponding vertical output line 102 among a plurality of vertical output lines 102, which are provided in every column of the matrix. Note that which vertical output line 102 is connected to which pixel 101 is determined according to the unit of lines for image signal reading.

The second chip 11 includes pixel drive circuits including column ADC blocks 111, a row scanning circuit 112, column scanning circuits 113, a timing control circuit 114, and the like. In addition, the second chip 11 includes a switching unit 116, a frame memory 117, an in-element calculation unit 118, a resizing conversion unit 119, and a parallel/serial conversion unit (which will be described as a "P/S conversion unit" below) 120.

The column ADC blocks 111 perform analog (A)-digital (D) conversion on signals output from the vertical output lines 102 connected with the pixel units 101, and outputs the converted signals.

The row scanning circuit 112 is connected to the pixel units 101 through the transfer signal lines 103, the reset signal lines 104, and the row selection signal lines 105.

A plurality of (two in the present embodiment) column scanning circuits 113 are connected with a plurality of column ADC blocks 111 respectively via corresponding horizontal signal lines 115-a and 115-b.

The timing control circuit 114 controls the column ADC blocks 111, the row scanning circuit 112, and the column scanning circuits 113 by outputting a timing control signal to each of them.

The switching unit 116 switches a channel of output image signals by alternatively selecting one of the horizontal signal line 115-a and 115-b and connecting the selected horizontal signal line to the input side of the frame memory 117.

The frame memory 117 acquires the image signal output from the switching unit 116 and temporarily stores the image signal as image data.

The in-element calculation unit 118 reads the image data from the frame memory 117 and performs calculation for resizing and compressing the image data according to the drive mode.

The resizing conversion unit 119 performs a resizing process on the image data stored in the frame memory 117 to a necessary angle of view based on the calculation result from the in-element calculation unit 118. Furthermore, the resizing conversion unit 119 outputs the image data that has undergone the resizing process to the P/S conversion unit 120.

The P/S conversion unit 120 performs parallel/serial conversion on the image data input from the resizing conversion unit 119 and transmits the converted signal to the imaging signal processing circuit 507 outside of the imaging element 506.

In this context, in the case the resizing and compressing processes are unnecessary, the image data is transferred from the switching unit 116 directly to the P/S conversion unit 120.

The imaging element 506 and the imaging signal processing circuit 507 are connected via a plurality of lanes 121 and 122. In the present embodiment, the main lane 121 and the sub-lane 122 are used. Signals of different pixels or signals of the same pixels are allocated and transferred to the main lane 121 and the sub-lane 122, or transferred only from the main lane 121, according to a drive mode.

The imaging element 506 has a structure in which the first chip 10 is stacked on the second chip 11. The first chip 10 has a plurality of pixel units 101 arrayed in a matrix shape. In addition, the first chip 10 is positioned on the light incidence side, that is, the side for receiving an optical image. By forming the pixel units 101 on the first chip 10 and forming the pixel drive circuits, the memory circuit, and the calculation circuit on the second chip 11 as described above, the manufacturing process can be divided for an imaging layer and a circuit layer of the imaging element 506. As a result, the wiring on the circuit layer can be made very thin and highly dense, and at the same time, a high speed, miniaturization, and high functionality of the imaging element 506 can be achieved. A specific structure of the imaging element 506 will be described below using FIG. 3.

Figure 2:
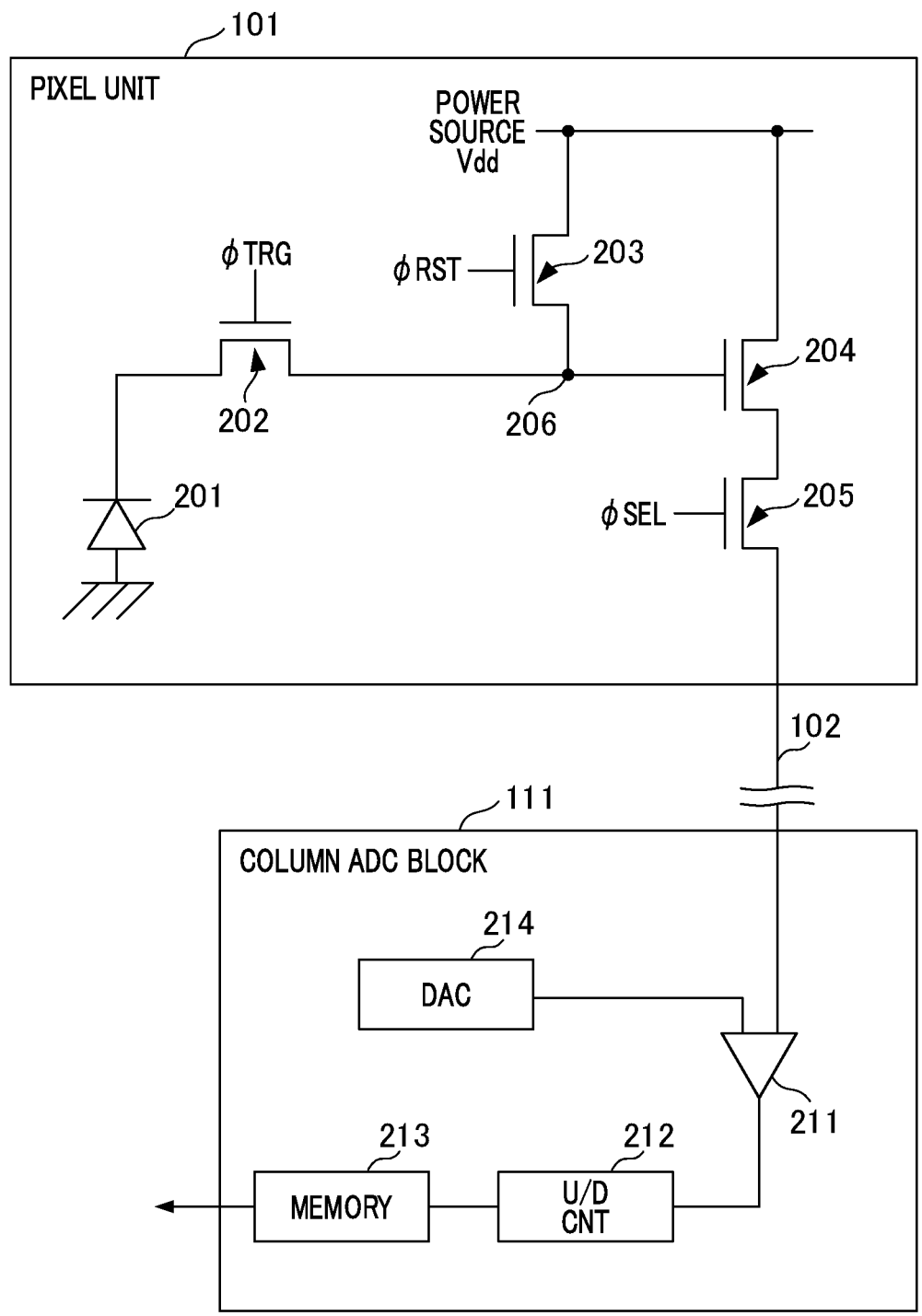
FIG. 2 is a diagram illustrating a configuration of a pixel unit and a column ADC block according to an embodiment of the present invention.

FIG. 2 is a diagram illustrating a configuration of the pixel unit 101 and the column ADC block 111 of the imaging element 506.

To describe the pixel unit 101 first, a photodiode (which will be denoted by PD below) 201, which constitutes a photoelectric conversion unit, photoelectrically converts light received from a subject to electric charge, the amount of which is corresponding to the amount of the light. The PD 201 has an anode grounded to the earth, and a cathode connected with a gate of the amplification transistor 204 via the transfer transistor 202. The node electrically connected with the gate of the amplification transistor 204 constitutes a floating diffusion part (which will be referred to as an FD part below) 206. The illustrated transistors 202 to 205 are, for example, N-channel metal oxide semiconductor (MOS) transistors.

The cathode of the PD 201 in connected with the FD part 206 via the transfer transistor 202. The transfer transistor 202 turns ON state by applying a transfer pulse φTRS to the gate via the transfer signal line 103 (see FIG. 1), and accordingly, electric charge that has been obtained by photoelectrical converting of the PD 201 is transferred to the FD part 206.

A reset transistor 203 has a drain connected with a pixel power supply Vdd and a source connected with the FD part 206. The reset transistor 203 turns ON by applying a reset pulse φRST to the gate via the reset signal line 104 (see FIG. 1). Accordingly, electric charge of the FD part 206 can be transported to the pixel power supply Vdd prior to a transfer of signal charge from the PD 201 to the FD part 206, and as a result, the FD part 206 is reset.

The amplification transistor 204 has a gate connected with the FD part 206 and a drain connected with the pixel power supply Vdd.

The electric potential of the FD part 206 after resetting by the reset transistor 203 is output as a reset level (a phase P).

That is, the phase P state is a state of the FD part 206 to be reset, in which a noise signal generated by the pixel unit 101 and a noise signal generated on a column signal line connecting pixel units can be acquired.

In addition, an electric potential of the FD part 206 after a signal is transferred via the transfer transistor 202 is output as a signal level (a phase D). That is, the phase D state is a state in which signal charge generated by the photoelectric conversion unit is transferred to and charged in the FD part 206, in which a pixel signal according to the signal charge can be acquired.

Suppressing noise by performing signal sampling multiple times in the phase D is called multi-sampling, and it is effective for suppressing random noise. The multi-sampling process is executed by that the overall control calculation unit 509 controls the timing control circuit 114 of the imaging element 506 and accordingly the timing control circuit 114 controls reading of signals from the pixel units 101. In the present embodiment, when the multi-sampling process is performed, the number of sampling operations on a pixel signal is changed according to a photographing mode, photographing conditions, or the like.

A selection transistor 205, for example, has a drain connected with the source of the amplification transistor 204 and a source connected with the vertical output line 102. The selection transistor 205 turns ON by applying a selection pulse φSEL to the gate via the row selection signal line 105 (see FIG. 1) and accordingly the corresponding pixel unit 101 is selected. In the selected pixel unit 101, a signal output from the amplification transistor 204 is output to the vertical output line 102 via the selection transistor 205 that is in the ON state. Further, the selection transistor 205 can also employ a circuit configuration disposed between the pixel power supply Vdd and the drain of the amplification transistor 204. In this context, the pixel unit 101 is not limited to the configuration in which the four transistors 202 to 205 illustrated in FIG. 2 are used, and may have a configuration, for example, in which three transistors are used, by being provided with a transistor serving both as the amplification transistor 204 and the selection transistor 205.

The image signals output from the pixel unit 101 via the vertical output line 102 are transferred to the corresponding column ADC block 111. The column ADC block 111 comprises a comparator 211, an up/down counter 212, a memory 213, and a DA converter (which will be abbreviated as DAC below) 214.

The comparator 211 has a pair of input terminals. Among these, one input terminal is connected with the vertical output line 102, and the other input terminal is connected with the DAC 214.

The DAC 214 outputs a ramp signal based on a reference signal input from the timing control circuit 114. The ramp signal is a signal of which the level changes at a predetermined slope according to the elapse of time.

The timing control circuit 114 outputs the reference signal to the DAC 214 based on a command from the overall control calculation unit 509.

The comparator 211 compares the level of the ramp signal input from the DAC 214 with the level of the image signal input from the vertical output line 102, and outputs a comparison signal indicating the comparison result. For example, when the level of the image signal is lower than the level of the ramp signal, the comparator 211 may output a high (H)-level comparison signal. In addition, when the level of the image signal is higher than the level of the ramp signal, the comparator 211 may output a low (L)-level comparison signal.

An input terminal of the up/down counter 212 is connected with an output terminal of the comparator 211, and inputs the comparison signal. The up/down counter 212 counts, for example, periods in which the comparison signal has the high level or has the low level. Through this counting processing, output signals of each pixel unit 101 is converted into a digital value. In this context, the column ADC block 111 may have a circuit configuration in which a logical AND circuit is provided between the comparator 211 and the up/down counter 212, a pulse signals are input to the AND circuit, and the up/down counter 212 counts the number of pulse signals.

The memory 213 is connected with an output terminal of the up/down counter 212 and stores a value counted by the up/down counter 212 (i.e. count value).

In this context, each of the column ADC blocks 111 counts a first count value corresponding to a reset level based on an image signal at the time of reset of the pixel unit 101. In addition, each of the column ADC blocks 111 counts a second count value based on an image signal after the elapse of a predetermined imaging time. The difference value between the first count value and the second count value may be stored in the memory 213. After that, the signal stored in the memory 213 is transferred to the horizontal signal lines 115-a and 115-b in synchronization with signals from the column scanning circuits 113.

Figure 3A:
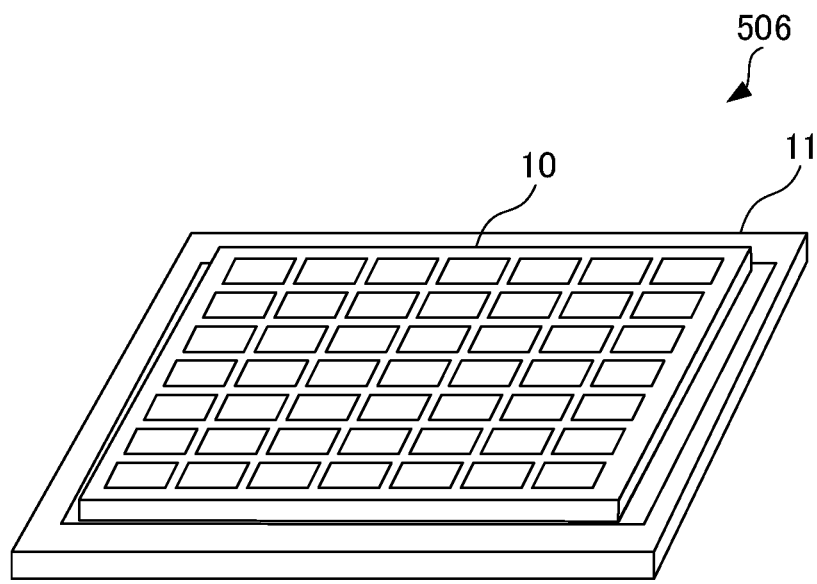
FIGS. 3A and 3B are perspective diagrams schematically illustrating an external configuration of the imaging element according to the embodiment of the present invention.
Figure 3B:
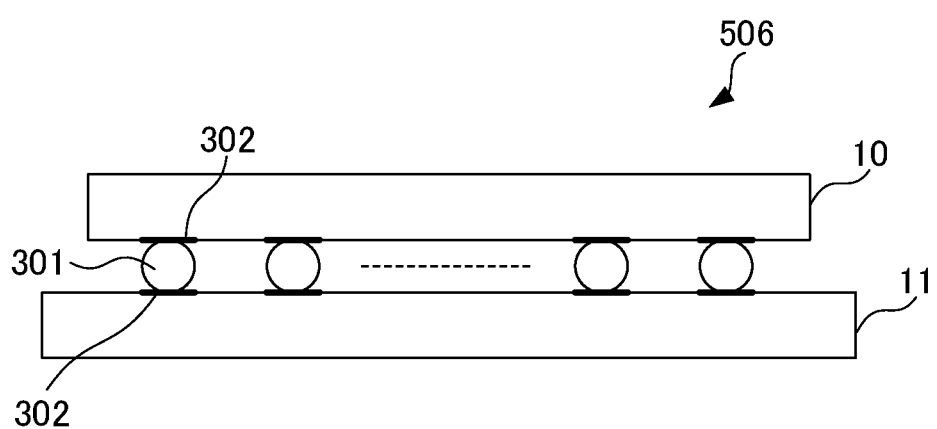

FIG. 3A and FIG. 3B are diagrams schematically illustrating an external configuration of the imaging element 506 according to the present embodiment. FIG. 3A is a perspective diagram of the imaging element 506 when viewed from obliquely above on the light incidence side. FIG. 3B is a schematic cross-sectional diagram of the imaging element 506. The first chip 10 forms the imaging layer, and the second chip 11 forms the circuit layer. The first chip 10 and the second chip 11 each have a plurality of micro pads 302 and are combined by being electrically connected to each other via a plurality of micro bumps 301.

Figure 4:
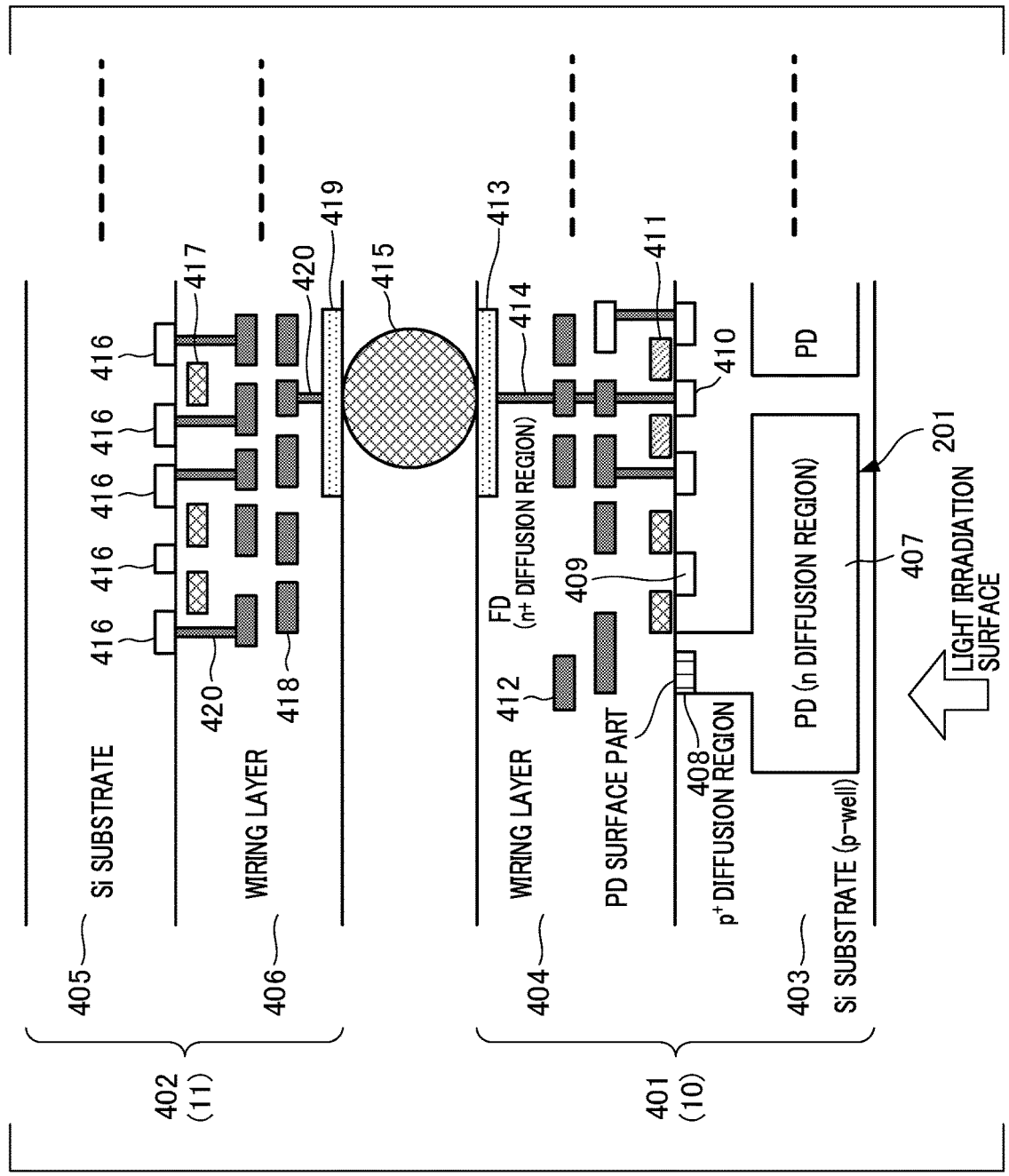
FIG. 4 is a schematic diagram illustrating a cross-sectional structure of the imaging element according to the embodiment of the present invention.

FIG. 4 is a diagram illustrating a cross-sectional structure of the imaging element 506 in detail. In FIG. 4, the first chip 10 is illustrated on the lower side and the second chip 11 is illustrated on the upper side. That is, an imaging layer 401 constituting the imaging unit corresponds to the first chip 10, and a circuit layer 402 corresponds to the second chip 11.

The imaging layer 401 has a configuration in which a wiring layer 404 is formed on a silicon (Si) substrate 403. An n diffusion region 407 serving as the PD 201 is formed on the Si substrate 403, and thus the imaging layer 401 employs a back-surface illumination structure. A $p^+$ diffusion region 408 is formed at a surface part of the PD 201, that is, a boundary part with respect to the wiring layer 404. A plurality of $n^+$ diffusion regions 409 serving as FD parts and a plurality of $n^+$ diffusion regions 410 serving as switch transistors are formed at a surface part of the Si substrate 403.

The wiring layer 404 includes an insulating layer formed of silicon dioxide ($SiO_2$) or the like. The insulating layer includes gate wirings 411 and signal transmission wirings 412, both of which are used for transistors. A micro pads 413 are formed of Cu or the like on a surface part of the wiring layer 404. The $n^+$ diffusion regions 409, the $n^+$ diffusion regions 410, and the gate wiring 411 of transistors constitute the transfer transistor 202, the reset transistor 203, the amplification transistor 204, and the selection transistor 205. A vias (VIA) 414 for connecting the $n^+$ diffusion regions 410 to the micro pads 413 are formed in the wiring layer 404.

The circuit layer 402 has a configuration in which a wiring layer 406 is formed on the Si substrate 405. A plurality of diffusion regions 416 of transistors are formed on a surface part of the Si substrate 405.

The wiring layer 406 includes an insulating layer formed of $SiO_2$ or the like. The insulating layer includes gate wiring 417 and signal transmission wiring 418, both of which are used for transistors. A micro pads 419 are formed of Cu or the like on a surface part of the wiring layer 406. The micro pads 419 are connected to the micro pads 413 via micro bumps 415. Vias 420 are formed in the wiring layer 406 to connect the diffusion regions 416 of the transistors and the like to the micro pads 419. Furthermore, in the circuit layer 402, the diffusion regions 416 of the transistors, the gate wiring 417 of the transistors, the signal transmission wiring 418, and the like constitute various circuits. Details of the configuration will be omitted since it is not an essential matter related to the present invention.

Although the configuration example in which the connection of the imaging layer 401 to the circuit layer 402 is made using the micro bumps 415 serving as a stacking connection terminals is illustrated in FIG. 4, an embodiment in which the imaging layer 401 is directly connected with the circuit layer 402 without using micro bumps is also possible.

Next, an imaging system of the present embodiment will be described with reference to FIG. 5. Although a digital camera that acquires moving image data and still image data is illustrated as an example, the invention is not limited thereto. For example, the invention can also be applied to surveillance cameras, mobile devices such as smartphones, in-vehicle cameras, and the like.

Figure 5:
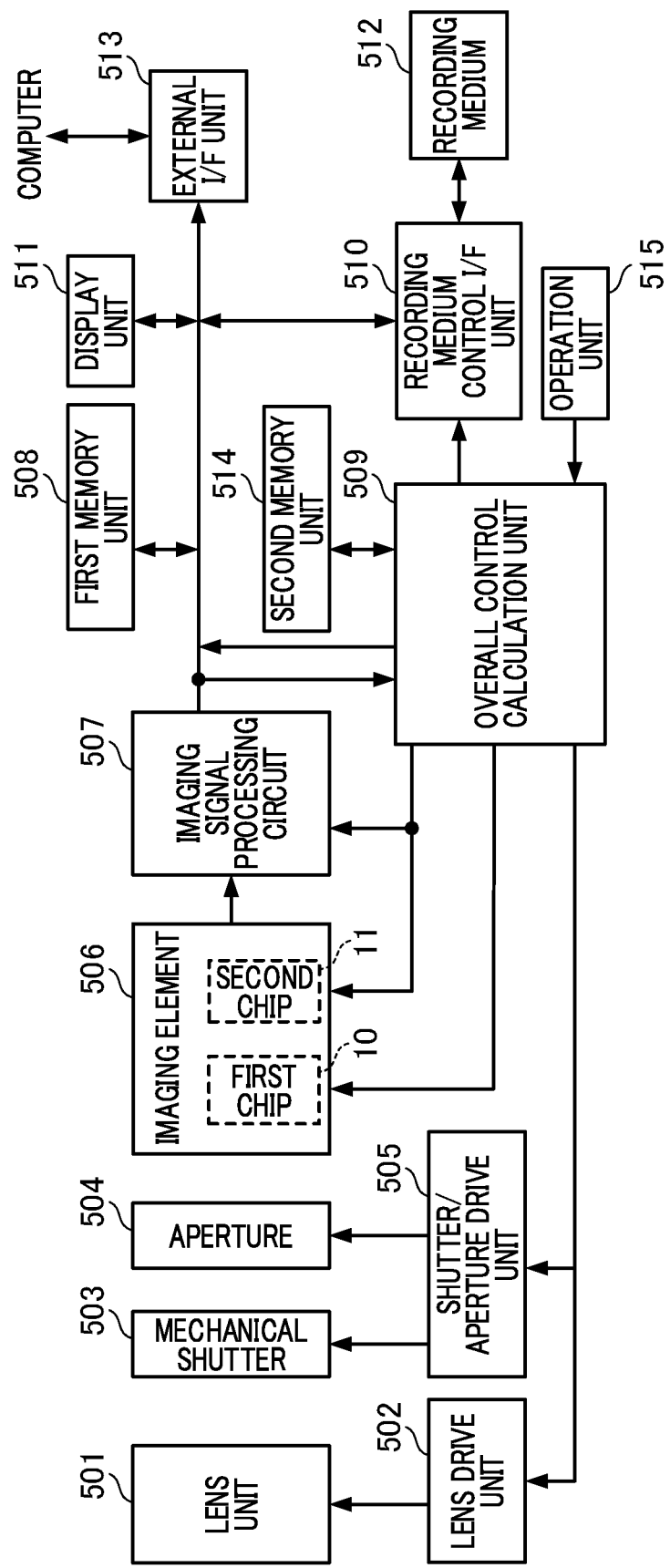
FIG. 5 is a block diagram illustrating an overview of an image-pickup apparatus according to an embodiment of the present invention.

FIG. 5 is a block diagram schematically illustrating an overview of an image-pickup apparatus using the imaging element 506.

A lens unit 501 includes a plurality of lenses constituting an imaging optical system. The lens unit 501 is an interchangeable lens device that can be installed in a camera body unit or a lens unit integrated with the camera body unit.

A lens drive unit 502 drives movable lenses constituting the imaging optical system. The movable lenses include a zoom lens that performs a magnification operation, a focus lens that performs a focus adjustment operation, a shift lens for image blur correction, and the like.

A mechanical shutter 503 is used to control an exposure time, and an aperture 504 is used to control an exposure amount.

A mechanical shutter/aperture drive unit (which is described as a shutter/aperture drive unit in the drawing) 505 drives the mechanical shutter 503 and the aperture 504.

Further, an optical filter such as a neutral density (ND) filter may be provided as a section for controlling an exposure amount.

The imaging element 506 receives light, which is propagated from a subject through the imaging optical system to form an image, to perform photoelectric conversion, and outputs an electrical signal.

The imaging signal processing circuit 507 processes the output signal from the imaging element 506 and outputs a processed image signal.

A first memory unit 508 stores the image signal processed by the imaging signal processing circuit 507 and other signals.

The overall control calculation unit 509 is a core unit that takes charge of controlling the entire imaging system and has a central processing unit (the CPU). The CPU controls operations of each unit by executing programs read from a second memory unit 514.

The second memory unit 514 stores not only the programs but also calculation results of the CPU, camera information set for the image-pickup apparatus through user operations, and the like.

A recording medium control interface (I/F) unit 510 performs a process of recording image signals and the like in a recording medium 512 and a process of reading information from the recording medium 512 according to control commands of the overall control calculation unit 509.

The recording medium 512 is detachable from the body of the image-pickup apparatus.

A display unit 511 includes a display device such as a liquid crystal display panel and displays image data and the like on a screen according to control commands of the overall control calculation unit 509.

An external interface (I/F) unit 513 is a communication processing unit that exchanges information with external apparatuses such as a computer.

An operation unit 515 includes input devices such as a switch, a touch panel, and the like, thereby, receives an operation instruction from a user and outputs an operation instruction signal to the overall control calculation unit 509. Information of driving conditions and the like of the image-pickup apparatus set by a user using the operation unit 515 is transmitted to the overall control calculation unit 509. The overall control calculation unit 509 controls the entire image-pickup apparatus based on the information. For this control, the overall control calculation unit 509 outputs control signals for controlling each of constituent components of the imaging element 506 to the in-element calculation unit 118 included in the imaging element 506. The control signals include an imaging synchronization signal, drive mode setting information, exposure setting information, and the like.

Light is irradiated from the subject, passes through the lens unit 501, then is adjusted by the aperture 504 to have an appropriate light amount, and forms an image on an imaging plane of the imaging element 506. Photoelectric conversion units, which constitutes the pixel units 101 of the imaging element 506, perform photoelectric conversion for the optical image of the subject and thereby output electrical signals. The electrical signals are subject to gain adjustment through gain control, converted from the analog signals to digital signals through A/D conversion, then imported as R, Gr, Gb, and B signals, and then transmitted to the imaging signal processing circuit 507. The imaging signal processing circuit 507 performs various signal processing such as a low-pass filtering for removing noise, shading correction, white balance processing, and the like on the input electrical signals, and further performs various kinds of correction, compression of the image signal, and the like.

The lens drive unit 502 performs control of zoom drive, focus drive, and the like with respect to the lens unit 501 during imaging. The mechanical shutter 503 and the aperture 504 are respectively driven by the mechanical shutter/aperture drive unit 505 according to control commands of the overall control calculation unit 509. The overall control calculation unit 509 performs control of the entire image-pickup apparatus and various calculations. The first memory unit 508 temporarily stores image signals after imaging. The recording medium control I/F unit 510 performs a process to record image signals in the recording medium 512. The display unit 511 displays captured images on the screen.

A CDS process will be described with reference to FIG. 6 and FIG. 7.

Figure 6:
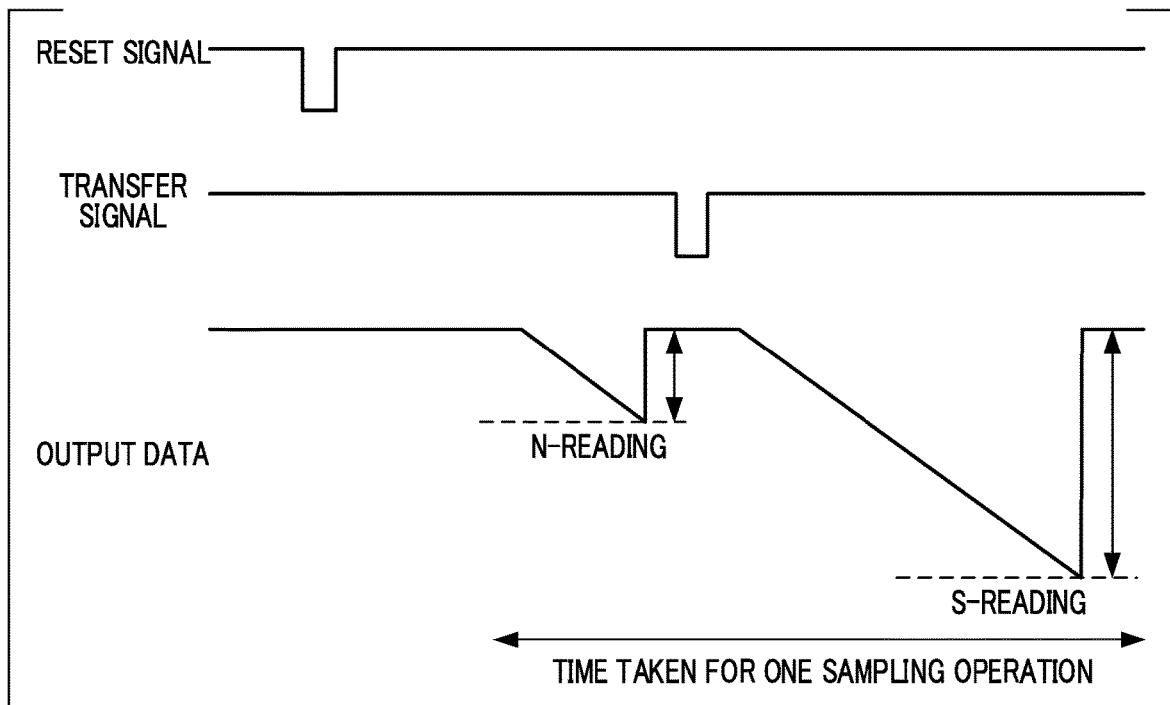
FIG. 6 is an explanatory diagram of correlation double sampling.

FIG. 6 is a timing chart for explaining an example of the CDS process, illustrating a reset signal, a transfer signal, and output data of the imaging element 506.

In the CDS process, sampling is executed by performing N-reading and S-reading. In the sampling, a pair of a reference signal (noise signal) acquired by N-reading and a pixel signal acquired by S-reading are created for each pixel unit and output from the imaging element 506. The imaging signal processing circuit 507 performs a process of subtracting the noise signal from the pixel signal acquired from the imaging element 506.

Figure 7:
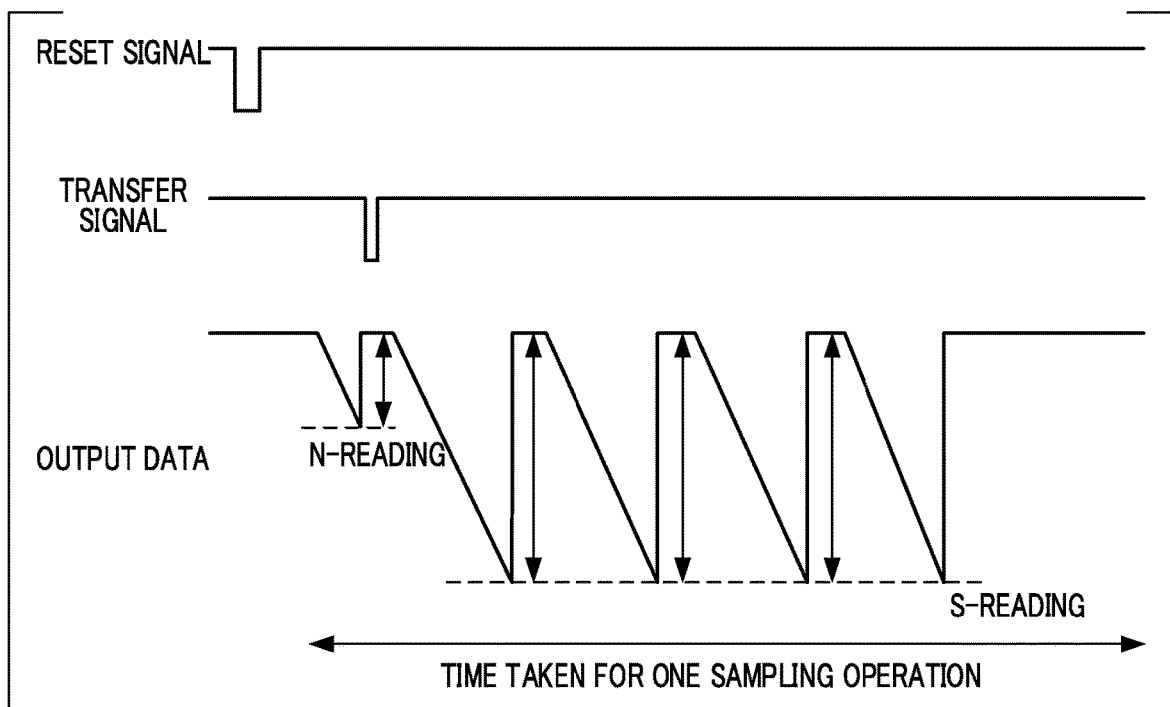
FIG. 7 is an explanatory diagram of multi-sampling.

FIG. 7 is a timing chart for explaining a case in which a plurality of S-reading are performed during a sampling period, illustrating a reset signal, a transfer signal, and output data of the imaging element 506.

During the sampling period, the plurality of S-reading operations are performed following one N-reading operation, and a noise signal and a pixel signal are respectively output from the imaging element 506. Then, as the multi-sampling, the arithmetic mean process of signals stored in the frame memory 117 included in the imaging element 506 is performed for each pixel unit, and further, a noise suppression process of subtracting the noise signal value acquired in N-reading from the mean of the plurality of signals acquired in S-reading is performed. In the multi-sampling, there are problems of a time required for reading signals becoming longer due to a lowering image signal reading rate (frame rate) and increasing power consumption. In the present embodiment, a multi-sampling process and a non-multi-sampling process are differently used according to photographing conditions, a mode setting of the image-pickup apparatus, or the like.

Figure 8:
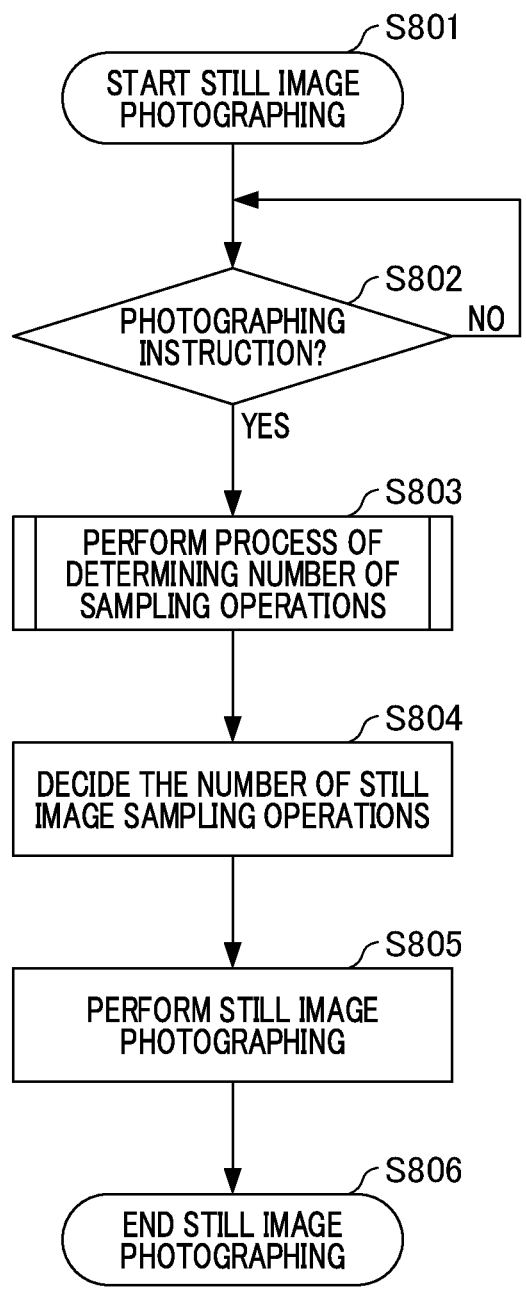
FIG. 8 is a flowchart for explaining a process of the embodiment of the present invention.

FIG. 8 is a flowchart for explaining a process of the embodiment of the present invention. The processes shown in each of the following steps are implemented by the CPU of the overall control calculation unit 509 executing a predetermined control program.

In S801, the image-pickup apparatus starts a process of a still image photographing mode.

In S802, the overall control calculation unit 509 determines whether there is a still image photographing instruction through a user operation. The user can execute the still image photographing instruction using an operation member included in the operation unit 515. If it is determined that there is a still image photographing instruction, the process proceeds to S803, and if it is determined that there is no still image photographing instruction, the determination process of S802 is repeated.

In S803, a process for determining the number of sampling operations of the imaging element 506 is executed. The determination process will be described below using FIG. 9 and FIG. 10.

Next, in S804, the overall control calculation unit 509 decides the number of sampling operations at the time of the still image photographing. The number of sampling operations is used in the multi-sampling process in the next step S805.

In S805, a still image photographing operation is performed. First, the in-element calculation unit 118 executes a multi-sampling process, that is, S-reading the number of times decided by the overall control calculation unit 509, and performs a process of calculating the arithmetic mean of the acquired signal for each pixel unit. Then, an image signal is generated based on the result of the arithmetic mean process and a noise signal acquired by N-reading and is output from the imaging element 506. The generated image signal further undergoes so-called an image development, display, and recording processes. After that, the photographing ends (S806).

Figure 9:
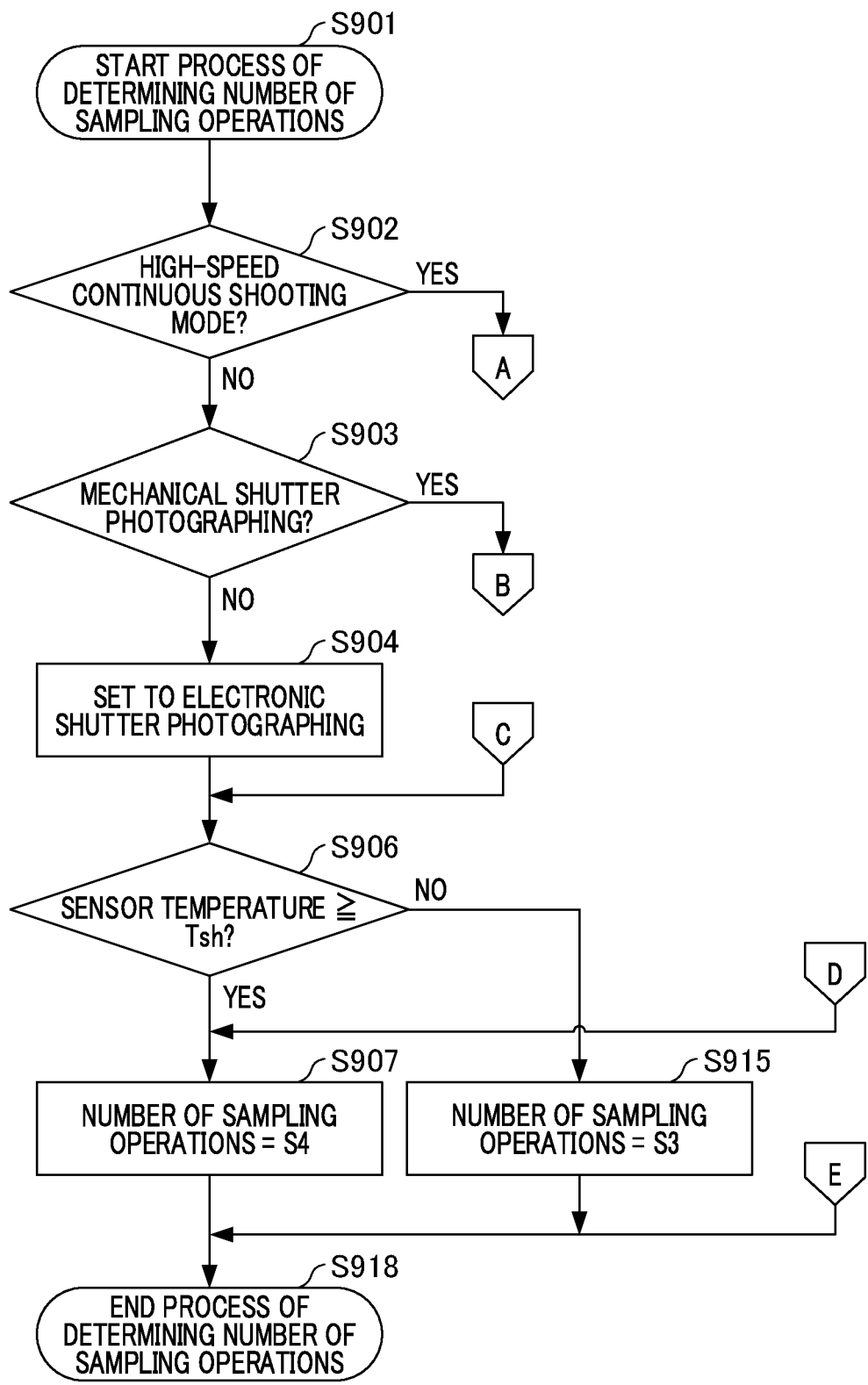
FIG. 9 and FIG. 10 are flowcharts of a determination process of the number of sampling operations in the embodiment of the present invention.
Figure 10:
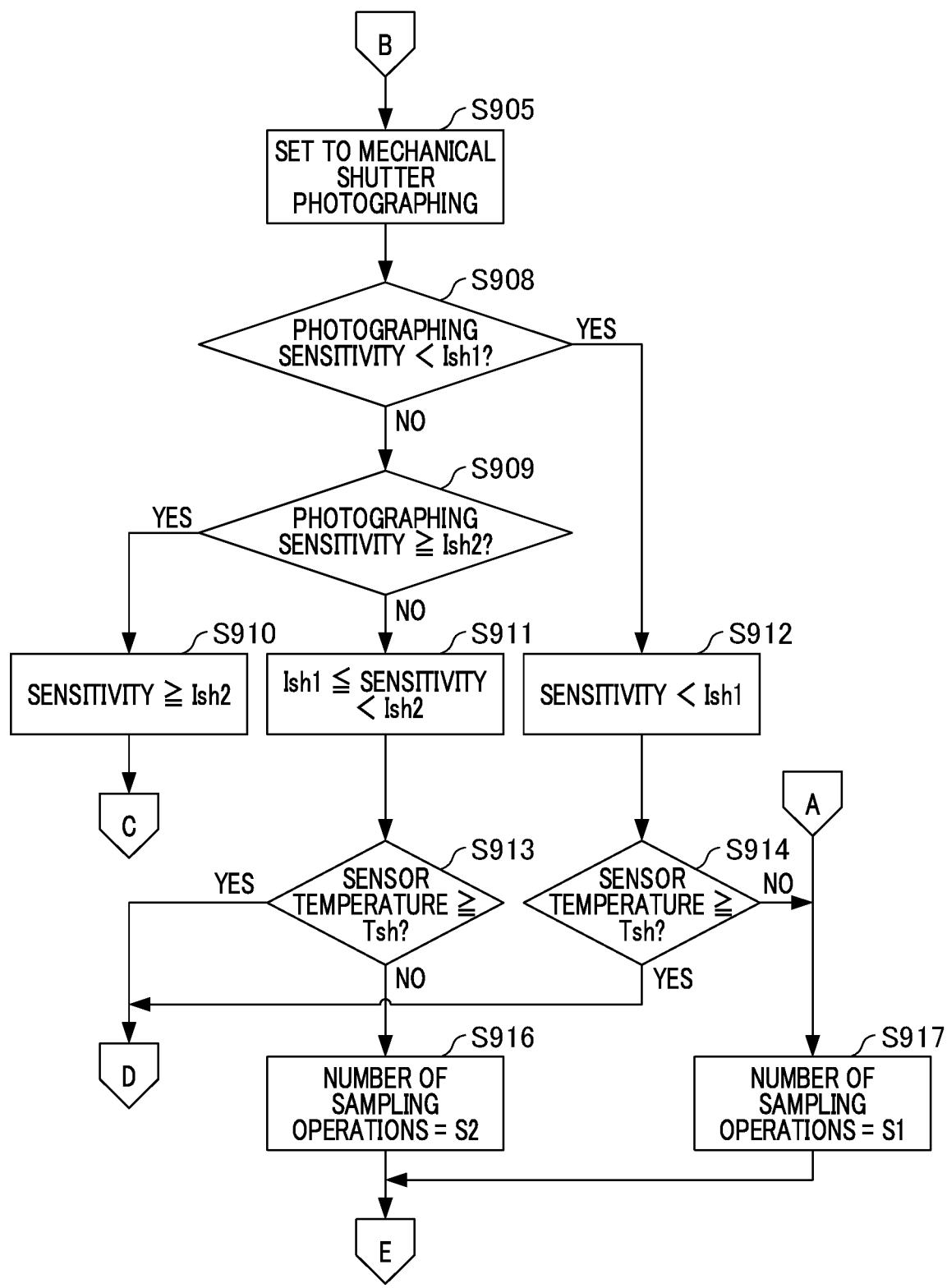

Next, the process of determining the number of sampling operations explained in S803 of FIG. 8 will be described in detail with reference to FIG. 9 and FIG. 10. FIG. 9 and FIG. 10 are flowcharts illustrating an example of the process of determining the number of sampling operations according to a photographing mode, a shutter drive form, photographing sensitivity, and a temperature of the imaging element. In the present embodiment, a first threshold value with respect to photographing sensitivity (ISO sensitivity) is denoted as Ish1, and a second threshold value thereto is denoted as Ish2. Here, it is assumed that Ish1<ISh2. In addition, a temperature threshold value with respect to a detected temperature of the imaging element 506 is denoted as Tsh.

In S901, the process of determining the number of sampling operations is started.

Next, in S902, the overall control calculation unit 509 determines whether the photographing mode of the image-pickup apparatus is a high-speed continuous shooting mode. If the photographing mode is the high-speed continuous shooting mode, the process proceeds to S917 of FIG. 10, and if the photographing mode is not the high-speed continuous shooting mode, the process proceeds to S903.

In S903, the overall control calculation unit 509 performs a process of determining a shutter drive form. If the form is determined to be mechanical shutter photographing, the process proceeds to S905 of FIG. 10, and if the form is determined to be electronic shutter photographing, the process proceeds to S904. Mechanical shutter photographing is photographing performed by blocking light using the mechanical shutter 503. In addition, electronic shutter photographing is photographing performed by electronically controlling an exposure timing using the electronic shutter function of the imaging element 506.

In S904, the shutter drive form is set to electronic shutter photographing. Furthermore, in S906, a process of determining a temperature of the imaging element 506 is performed. In the process of determining a temperature, the overall control calculation unit 509 acquires a temperature detection signal with respect to the imaging element 506 detected by a temperature detection element. In addition, whether the detected temperature indicated by the temperature detection signal is higher than or equal to a predetermined temperature threshold value Tsh is determined. If the detected temperature is determined to be higher than or equal to the threshold value Tsh, the process proceeds to S907, and if the detected temperature is determined to be lower than the threshold value Tsh, the process proceeds to S915.

The overall control calculation unit 509 sets the number of sampling operations to a predetermined number (assumed to be S4) in S907, and then the process of determining the number of sampling operations ends in S918.

On the other hand, the overall control calculation unit 509 determines the number of sampling operations to a predetermined number (assumed to be S3) in S915. In the present embodiment, it is assumed that the relationship "S3<S4" is satisfied. After S915, the process of determining the number of sampling operations ends in S918.

The overall control calculation unit 509 sets the shutter drive form to mechanical shutter photographing in S905 of FIG. 10.

In the next S908, it is determines whether the photographing sensitivity is lower than the first threshold value Ish1. If the photographing sensitivity is determined to be lower than the first threshold value Ish1, the process proceeds to S912, and if the photographing sensitivity is determined to be higher than or equal to the first threshold value Ish1, the process proceeds to S909.

In S909, the overall control calculation unit 509 determines whether the photographing sensitivity is higher than or equal to the second threshold value Ish2. If the photographing sensitivity is determined to be higher than or equal to the second threshold value Ish2, the process proceeds to S910, and if the photographing sensitivity is determined to be lower than the second threshold value Ish2, the process proceeds to S911.

In S910, the photographing sensitivity is set to be "higher than or equal to the second threshold value Ish2", and then the process proceeds to S906 of FIG. 9.

On the other hand, in S911, the photographing sensitivity is set to be "higher than or equal to the first threshold value Ish1" and "lower than the second threshold value Ish2", and then the process proceeds to S913.

In S913, the overall control calculation unit 509 determines whether the detected temperature of the imaging element 506 is higher than or equal to Tsh. If the detected temperature is determined to be higher than or equal to the threshold value Tsh, the process proceeds to S907 of FIG. 9, and on the other hand, if the detected temperature is determined to be lower than the threshold value Tsh, the process proceeds to S916. In S916, the overall control calculation unit 509 determines the number of sampling operations to a predetermined number (assumed to be S2). In the present embodiment, it is assumed that the relationship "S2<S3" is satisfied. After S916, the process of determining the number of sampling operations ends.

On the other hand, the photographing sensitivity is set to be "lower than the first threshold value Ish1" in S912, and then the process proceeds to S914.

In S914, the overall control calculation unit 509 determines whether the detected temperature of the imaging element 506 is higher than or equal to the threshold value Tsh. If the detected temperature is determined to be higher than or equal to the threshold value Tsh, the process proceeds to S907 of FIG. 9. On the other hand, if the detected temperature is determined to be lower than the threshold value Tsh, the process proceeds to S917, and the overall control calculation unit 509 determines the number of sampling operations to a predetermined number (assumed to be S1). In the present embodiment, it is assumed that the relationship "S1<S2" is satisfied. In addition, S1=1 is satisfied in the present embodiment. After S917, the process of determining the number of sampling operations ends.

In the example illustrated in FIG. 9 and FIG. 10, as a factor to determine the number of sampling operations, whether the mode is the high-speed continuous shooting mode, that is, whether a high speed of the imaging element is necessary, is determined. In the high-speed continuous shooting mode, the number of sampling operations is set to a minimum value (one in the present embodiment) and then an imaging operation is performed.

In addition, the shutter drive form is determined, and the number of sampling operations has a value set differently according to whether the form is mechanical shutter drive or electronic shutter drive. Since the rolling distortion that occurs due to a moving subject, shaking of the image-pickup apparatus, or the like can occur in principle in the electronic shutter photographing, the determination of whether high-speed signal reading of the imaging element is necessary is made.

With respect to photographing sensitivity and detected temperature of the imaging element, when the imaging element has higher photographing sensitivity or a higher detected temperature, noise of the imaging element is likely to occur more easily. For this reason, the determination on whether noise suppression is necessary is made.

Taking the above-described factors into account, the number of sampling operations is determined to any value satisfying the relationship "S4>S3>S2>S1" in the processes exemplified in S907, S915, S916, and S917. That is, the multi-sampling process of performing sampling pixel signals a plurality of times is determined to execute in the case of S907, S915, or S916, and the non-multi-sampling process of performing sampling pixel signals one time is determined to execute in the case of S917.

The present embodiment is merely an example, and another factor, for example, an exposure time of the imaging element, may be used as a factor to determine the number of sampling operations. That is, since noise is likely to be generated more easily as an exposure time becomes longer, the number of sampling operations may be increased as the exposure time during photographing becomes longer. In addition, since rolling distortion becomes more noticeable as the focal distance of the imaging optical system determined from the position of the lens unit 501 gets longer, the number of sampling operations may be higher as the focal distance during photographing gets shorter. As described above, as long as the operation is control of changing the number of sampling operations for pixel signals according to various parameters during photographing of the image-pickup apparatus or control of switching between the non-multi-sampling process and the multi-sampling process, it can be employed as a control method for the image-pickup apparatus of the present invention.

In the present embodiment, the example limited to the still-image photographing mode (so-called single shooting mode) has been described. In a moving image photographing mode or a still image continuous shooting mode (so-called a continuous shooting mode), the multi-sampling process is not executed and the non-multi-sampling process is executed.

In addition, in an embodiment in which a photographing method of performing exposure several times, acquiring image data each time, and combining the plurality of pieces of image data is possible for the purpose of an expansion of a dynamic range, or the like, a process of differently using a plurality of modes corresponding to the photographing method is performed. In the first mode among the plurality of modes, the non-multi-sampling process (a mode in which N-reading and S-reading are performed one time each) is executed in each exposure. On the other hand, in the second mode, the multi-sampling process is executed in each exposure.

Further, although the example in which the noise signal is acquired in one sampling operation for speeding up the processing in N-reading has been described in the present embodiment, a plurality of sampling operations may be performed if necessary. The first mode described above may be selected if a high speed or low power consumption is needed.

In addition, factors for determining the number of sampling operations further include, in addition to those described above, the presence/absence of a moving object within the screen, the presence/absence of a person (face) as a subject, a scene determination result such as a night view, backlight, or the like, the number of image signals to be output (i.e., the number of outputting pixels), a frame rate, accuracy of A/D conversion, and the like. Any one or a combination of a plurality of these factors may be used as factors for determining the number of sampling operations, instead of or in addition to the factors employed in the present embodiment.

Although the present embodiment explains that A/D conversion is performed each time a signal is output from each pixel unit 101 to the vertical output lines 102 when multi-sampling is performed, a method other than this may be used. For example, capacitors in which analog signals input from the vertical output lines 102 to the column ADC blocks 111 are clamped may be provided and multi-sampling may be performed by allowing the capacitors to clamp the analog signals multiple times. In addition, the image-pickup apparatus according to the present invention may be constituted so that the plurality of analog signals acquired from the multi-sampling are enabled to be input to the individual column ADC blocks 111 and thereby digital signals that are the results of A/D conversion are averaged.

According to the present embodiment, the image-pickup apparatus including the imaging element that can perform the multi-sampling process can suppress noise at a higher speed through control of changing the number of sampling operations while reducing power consumption.

This application claims the benefit of Japanese Patent Application No. 2018-129311, filed Jul. 6, 2018, which is hereby incorporated by reference wherein in its entirety.

What is claimed is:

1. An image-pickup apparatus comprising:
an imaging element having a plurality of pixel units; and
a control unit controlling sampling operations for signals based on signal charges generated by photoelectric conversion units of the plurality of pixel units by receiving light one time,
wherein the control unit changes a number of sampling operations of the signals such that the number of sampling operations when an imaging is performed using an electronic shutter function of the imaging element is set to be greater than when the imaging is performed using a mechanical shutter.

2. The image-pickup apparatus according to claim 1, wherein the control unit switches the number of sampling operations when imaging a still image is performed.

3. The image-pickup apparatus according to claim 1, wherein the control unit switches the number of sampling operations to one when continuously imaging still images or imaging moving images is performed.

4. The image-pickup apparatus according to claim 1, wherein;
the imaging element includes a first substrate and a second substrate that is different from the first substrate,
the first substrate has an imaging layer formed to have the plurality of pixel units, and
the second substrate has a circuit layer formed to have, and
wherein the imaging element further comprises:
a storage that stores noise signals and the signals based on the signal charges acquired from the pixel units, and
a processor that performs an arithmetic process of the signals acquired by a plurality of sampling operations for each pixel unit and read from the storage.

5. An image-pickup apparatus comprising:
an imaging element having a plurality of pixel units; and
a control unit controlling sampling operations for signals based on signal charges generated by photoelectric conversion units of the plurality of pixel units by receiving light one time,
wherein the control unit changes a number of sampling operations of the signals such that the number of sampling operations when a temperature of the imaging element is higher than or equal to a predetermined temperature threshold value is set to be greater than when a temperature of the imaging element is lower than the predetermined temperature threshold value.

6. The image-pickup apparatus according to claim 5, wherein the control unit classifies sensitivity values of the imaging element into a plurality of sensitivity ranges and determines the number of sampling operations according to the sensitivity ranges so that the higher a sensitivity range is, the greater the number of sampling operations is when a temperature of the imaging element is lower than the predetermined temperature threshold value.

7. An image-pickup apparatus comprising:
an imaging element having a plurality of pixel units; and
a control unit controlling sampling operations for signals based on signal charges generated by photoelectric conversion units of the plurality of pixel units by receiving light one time,
wherein the control unit determines a number of sampling operations to be a first number when an imaging sensitivity is lower than a first threshold value and a temperature of the imaging element is lower than a temperature threshold value, and determines the number of sampling operations to be another number greater than the first number when imaging sensitivity is higher than or equal to the first threshold value or a temperature of the imaging element is higher than or equal to the temperature threshold value.

8. The image-pickup apparatus according to claim 7, wherein the control unit determines the number of sampling operations to be a second number greater than the first number when imaging sensitivity is higher than or equal to the first threshold value and lower than a predetermined second threshold value that is greater than the first threshold value, and a temperature of the imaging element is lower than the temperature threshold value.

9. The image-pickup apparatus according to claim 8, wherein the control unit determines the number of sampling operations to be a third number greater than the second number when imaging sensitivity is higher than or equal to the predetermined second threshold value and a temperature of the imaging element is lower than the temperature threshold value.

10. The image-pickup apparatus according to claim 9, wherein the control unit determines the number of sampling operations to be a fourth number greater than the third number when imaging sensitivity is lower than the first threshold value and a temperature of the imaging element is higher than or equal to the temperature threshold value.

11. The image-pickup apparatus according to claim 9, wherein the control unit determines the number of sampling operations to be a fourth number greater than the third number when imaging sensitivity is higher than or equal to the first threshold value and is lower than the predetermined second threshold value, and a temperature of the imaging element is higher than or equal to the temperature threshold value.

12. An image-pickup apparatus comprising:
an imaging element having a plurality of pixel units; and
a control unit controlling sampling operations for signals based on signal charges generated by photoelectric conversion units of the plurality of pixel units by receiving light one time,
wherein the control unit determines a number of sampling operations to be a first number when an imaging sensitivity is lower than a first threshold value, and determines the number of sampling operations to be another number greater than the first number when imaging sensitivity is higher than or equal to the first threshold value.

13. The image-pickup apparatus according to claim 12, wherein the control unit determines the number of sampling operations to be a second number greater than the first number when imaging sensitivity is higher than or equal to the first threshold value and lower than a predetermined second threshold value that is greater than the first threshold value.

14. The image-pickup apparatus according to claim 13, wherein the control unit determines the number of sampling operations to be a third number greater than the second number when imaging sensitivity is higher than or equal to the predetermined second threshold value.

15. The image-pickup apparatus according to claim 14, wherein the control unit determines the number of sampling operations to be a fourth number greater than the third number when imaging sensitivity is lower than the first threshold value.

16. The image-pickup apparatus according to claim 15, wherein the control unit determines the number of sampling operations to be a fourth number greater than the third number when imaging sensitivity is higher than or equal to the first threshold value and is lower than the predetermined second threshold value.

* * * * *